Feb. 21, 1967 J. H. GASSLER 3,305,865
RUNWAY IMAGE GENERATING APPARATUS
Filed June 29, 1964 6 Sheets-Sheet 1

INVENTOR.
JOHN H. GASSLER
BY S.C. Yeaton
ATTORNEY $$\tan A = \frac{Q}{R'} = \frac{Q}{\frac{h}{\tan \gamma_0}} = \frac{Q \tan \gamma_0}{h} = \frac{(L+R'+\delta L)\tan D \tan \gamma_0}{h} = \frac{(L+\frac{h}{\tan \gamma_0}+\delta L)\tan D \tan \gamma_0}{h}$$

$$\therefore A \cong \frac{(L+\delta L)\gamma_0 D}{h} + D$$

INVENTOR.
JOHN H. GASSLER
BY
S. C. Yeaton
ATTORNEY

Feb. 21, 1967 J. H. GASSLER 3,305,865

RUNWAY IMAGE GENERATING APPARATUS

Filed June 29, 1964 6 Sheets-Sheet 3

INVENTOR.
JOHN H. GASSLER
BY
S. C. Yeaton
ATTORNEY

INVENTOR.
JOHN H. GASSLER
BY
ATTORNEY

INVENTOR.
JOHN H. GASSLER
BY S. C. Yeaton
ATTORNEY

Feb. 21, 1967 J. H. GASSLER 3,305,865

RUNWAY IMAGE GENERATING APPARATUS

Filed June 29, 1964

6 Sheets-Sheet 6

INVENTOR.
JOHN H. GASSLER
BY
S.C. Yeaton
ATTORNEY

United States Patent Office 3,305,865

Patented Feb. 21, 1967

3,305,865

RUNWAY IMAGE GENERATING APPARATUS

John H. Gassler, Levittown, N.Y., assignor to Sperry Rand Corporation, Great Neck, N.Y., a corporation of Delaware Filed June 29, 1964, Ser. No. 378,927
11 Claims. (Cl. 343—108)

Figures 1A, 1B, 1C:
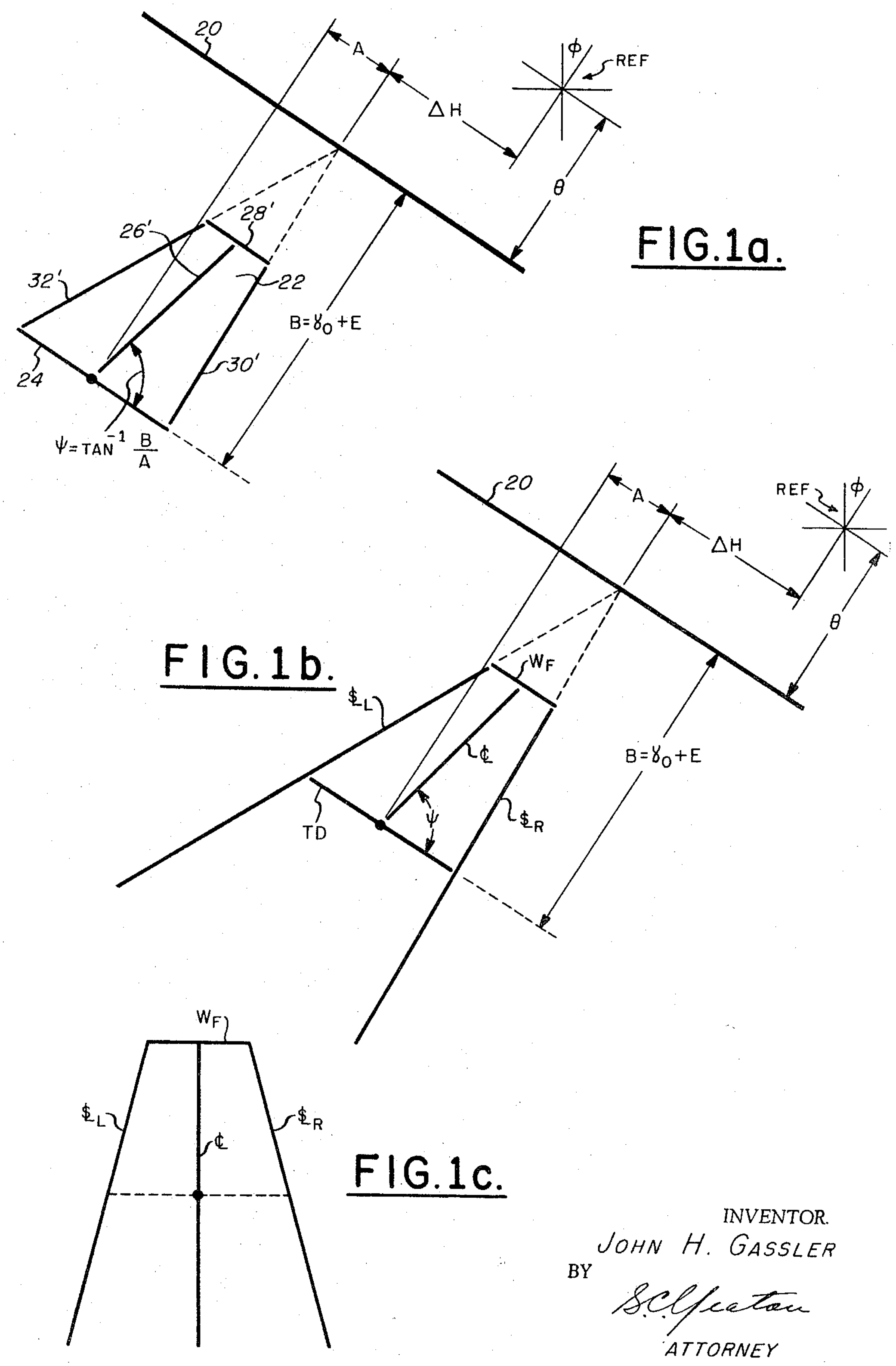

This invention relates in general to aircraft control apparatus, and in particular it improves on the runway image producing technique incorporated into the windscreen display apparatus of copending application S.N. 374,717 entitled Runway Image Generating Apparatus, invented by Ralph C. Rover, Jr. and filed June 12, 1964, which application is assigned to the instant assignee.

The apparatus of application S.N. 374,717 was designed for use within practical altitude (or range) limits, whereby for example at an altitude of 750 feet a runway image first starts to take size and grow as the craft nears touchdown, and whereby at 70 feet of altitude the runway image reaches its maximum size and thereafter ceases to be useful in landing an aircraft. The lower altitude limit on the image producing technique of application S.N. 374,717 results from the fact that signals representing the front center line and end of the runway (which signals grow in magnitude faster than other runway image producing signals) are there provided by an altitude responsive servo that drives the wiper of a suitably wound or loaded potentiometer, and at 70 feet of altitude the signal appearing on the wiper reaches its maximum value, i.e. the potentiometer excitation voltage.

The present invention proposes elimination of the potentiometer used for producing the "front" runway image lines, whereby altitude responsive servo driven function potentiometers used for providing signals for generating image lines representing the runway touchdown line, and far end and center lines may be so arranged that they cease providing changing signals when the craft reaches a lower altitude of, for example, 20 feet.

To compensate for the elimination of the front runway image lines, the side lines of the runway image are doubled in length, thereby imbuing the locally generated runway image with a small amount of tolerable distortion in the appearance of the near end lines of the image. This distortion is tolerable since it is seen when the craft is at an extended range, and also because striking mislocation of the runway near end is prevented by its complete elimination. At about 70 feet of altitude, the runway threshold line, as taught by the instant invention, is eliminated and the center line of the runway image is doubled in length (like the side lines), whereby a cue is optically given to the pilot for commencement of a flare-out maneuver, and whereby the side lines will continue to grow as the craft nears 20 feet of altitude, and will optically appear to move by the eyes of the pilot in the same manner that the real world runway side lines appear to do during a landing.

Since the present invention is basically an improvement on the runway image producing techniques of aforementioned copending application many of the terms, techniques and quantities which are common to these applications are repeated and employed here, whereby the description is greatly facilitated.

A principal object of the invention is to provide improved runway image producing apparatus.

Another object of the invention is to provide runway image defining apparatus that is less costly and better than prior art systems.

Another object of the invention is to provide apparatus for providing a locally generated runway image that changes in makeup to cue a flare-out maneuver.

Another object of the invention is to provide aircraft apparatus that provides a locally generated runway image that changes in makeup as the craft nears the ground.

Another object of the invention is to provide aircraft apparatus that provides a runway image useful during the final seconds of flight before touchdown onto a runway.

The invention will be described with reference to the figures:

FIGS. 1*a* and 1*b* are diagrams useful in showing the derivation of signals employed in apparatus embodying the invention, and FIG. 1*c* shows the runway image as it appears below a certain altitude.

Figure 2A:
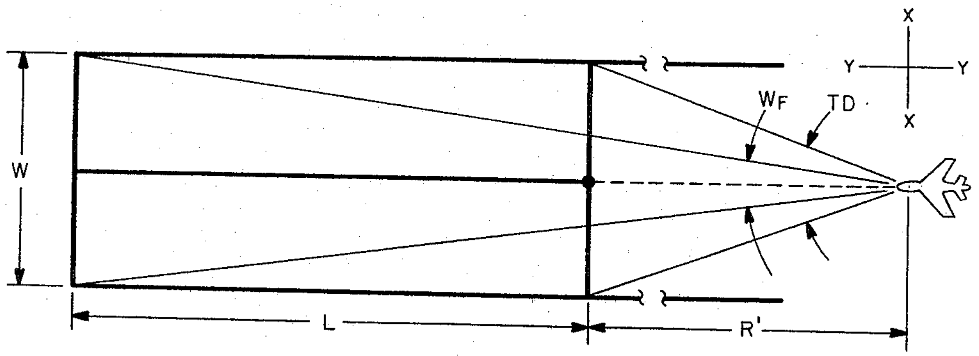
Figure 2B:
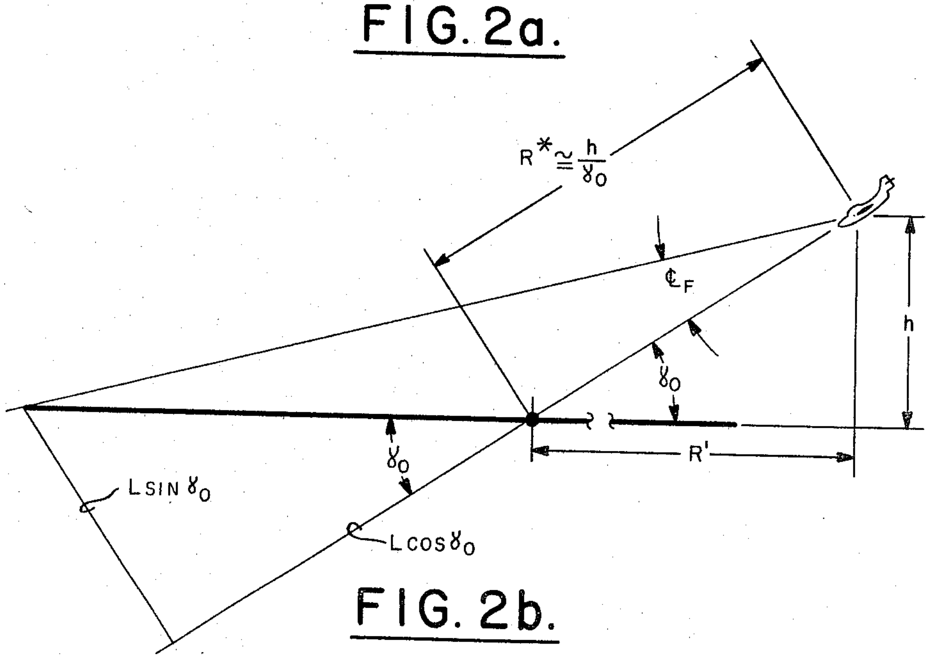

FIGS. 2*a* and 2*b* are plan and profile views showing an aircraft during a landing maneuver.

Figure 3:
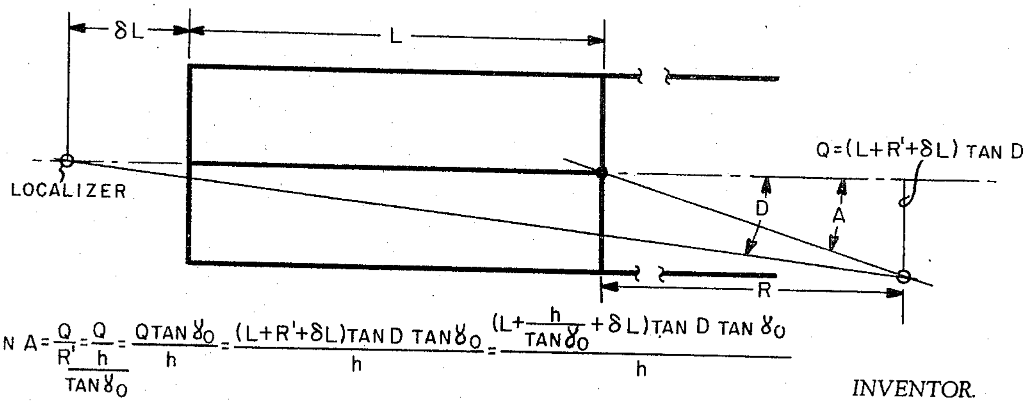

FIG. 3 is a diagram showing how a certain desired quantity may be computed from data received from a localizer radio link to the ground.

Figure 4A:
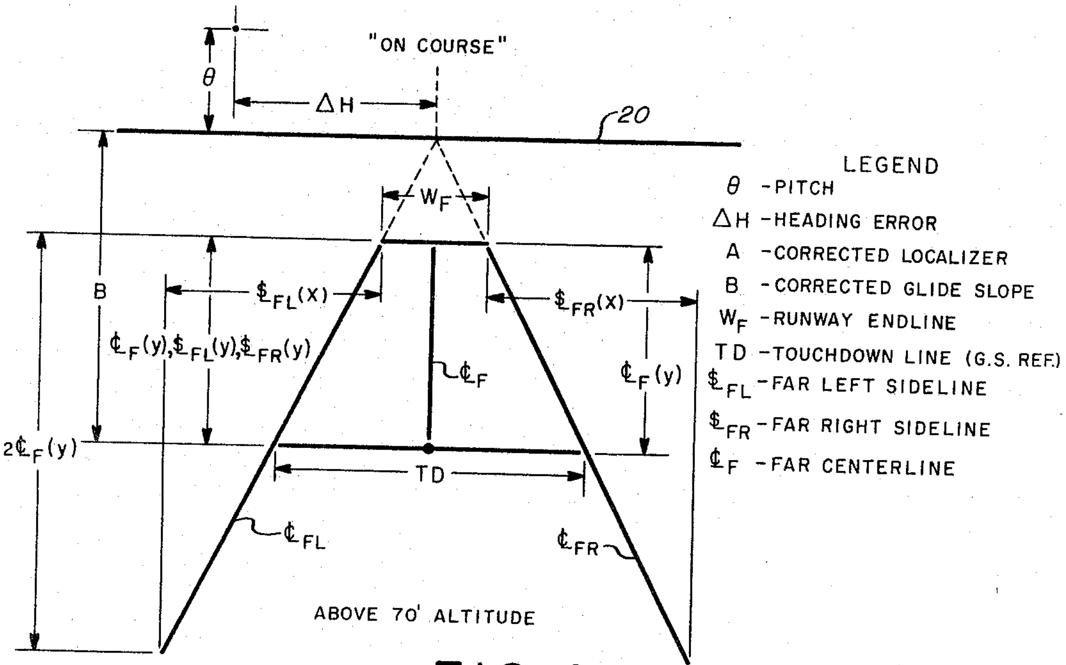
Figure 4B:
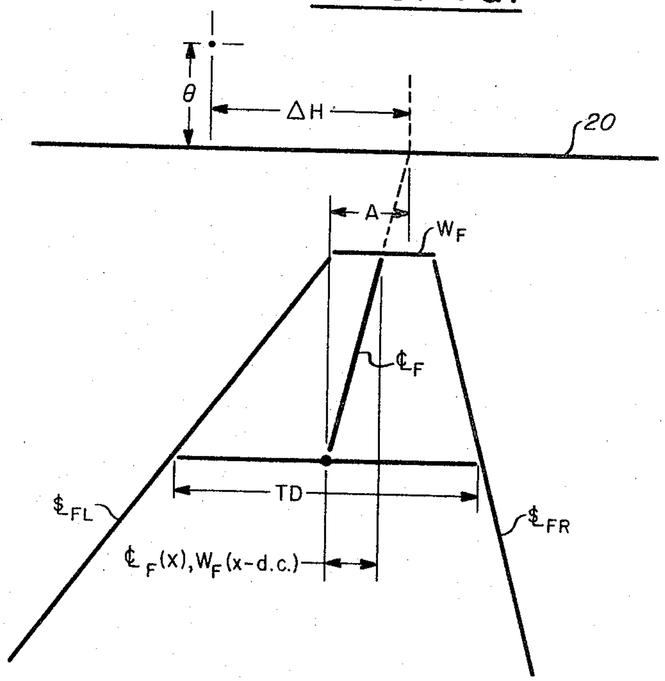

FIGS. 4*a* and 4*b* are diagrams showing the appearance of a runway image according to the invention when the craft is respectively on and off course during a landing maneuver.

Figure 5A:
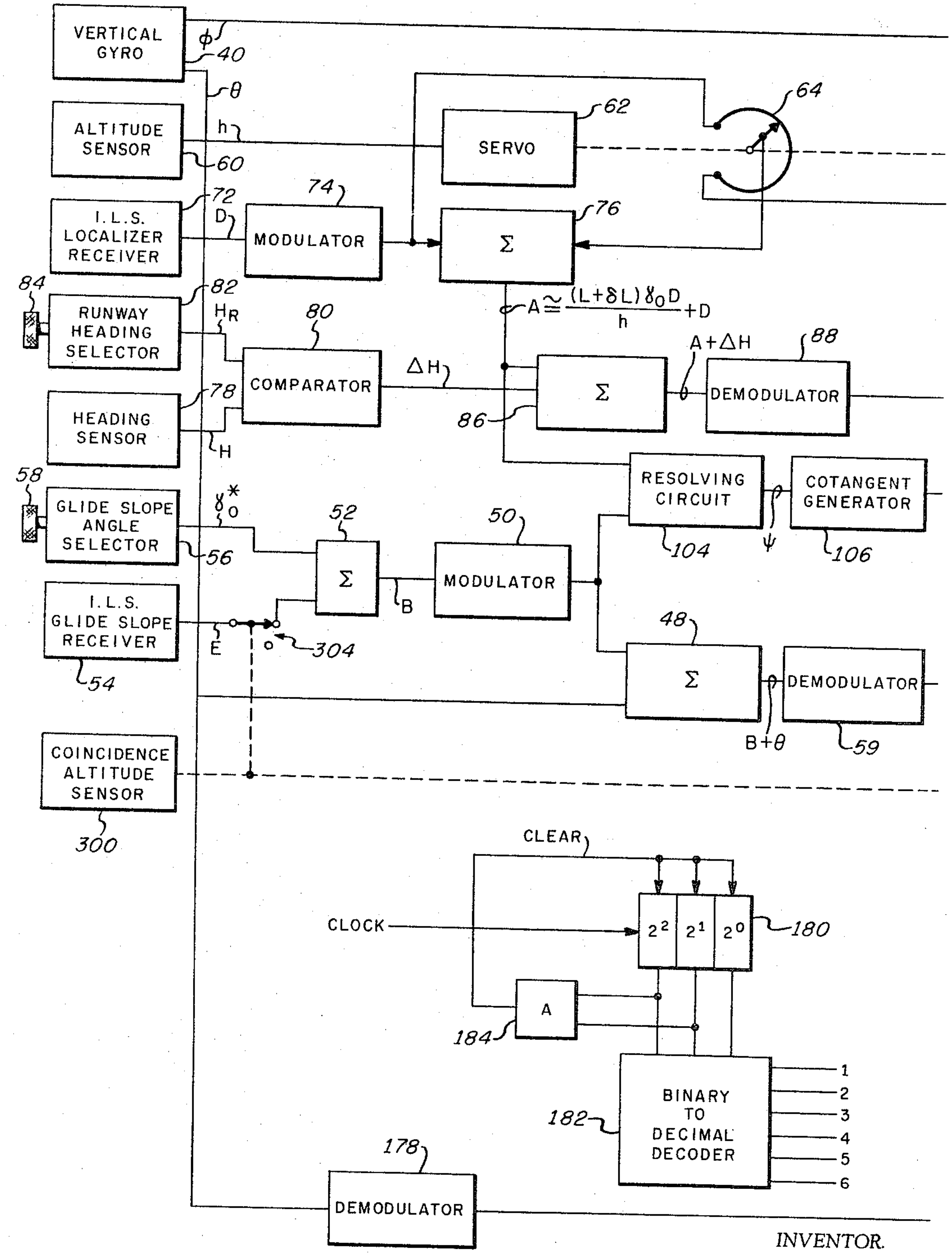
Figure 5B:
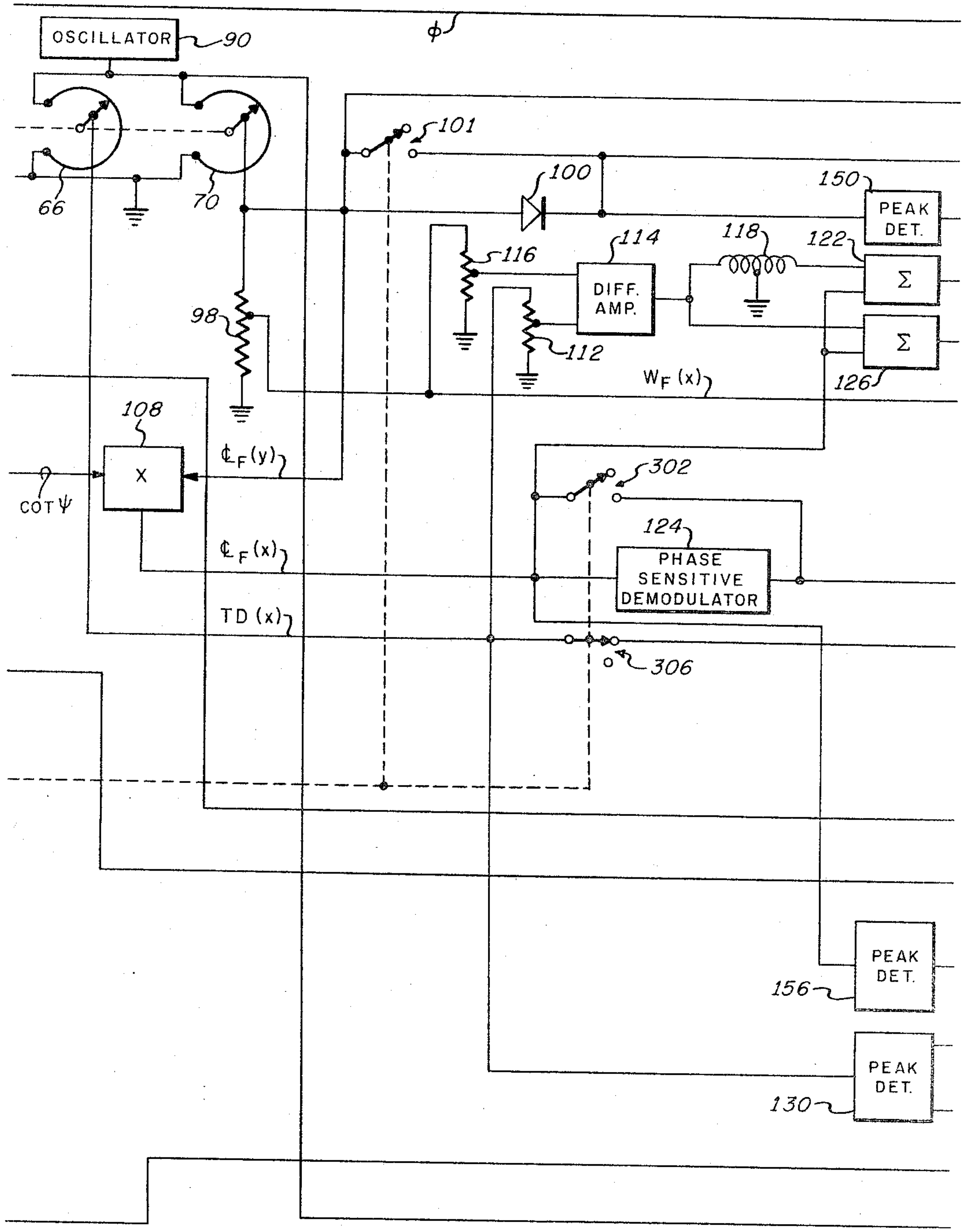
Figure 5C:
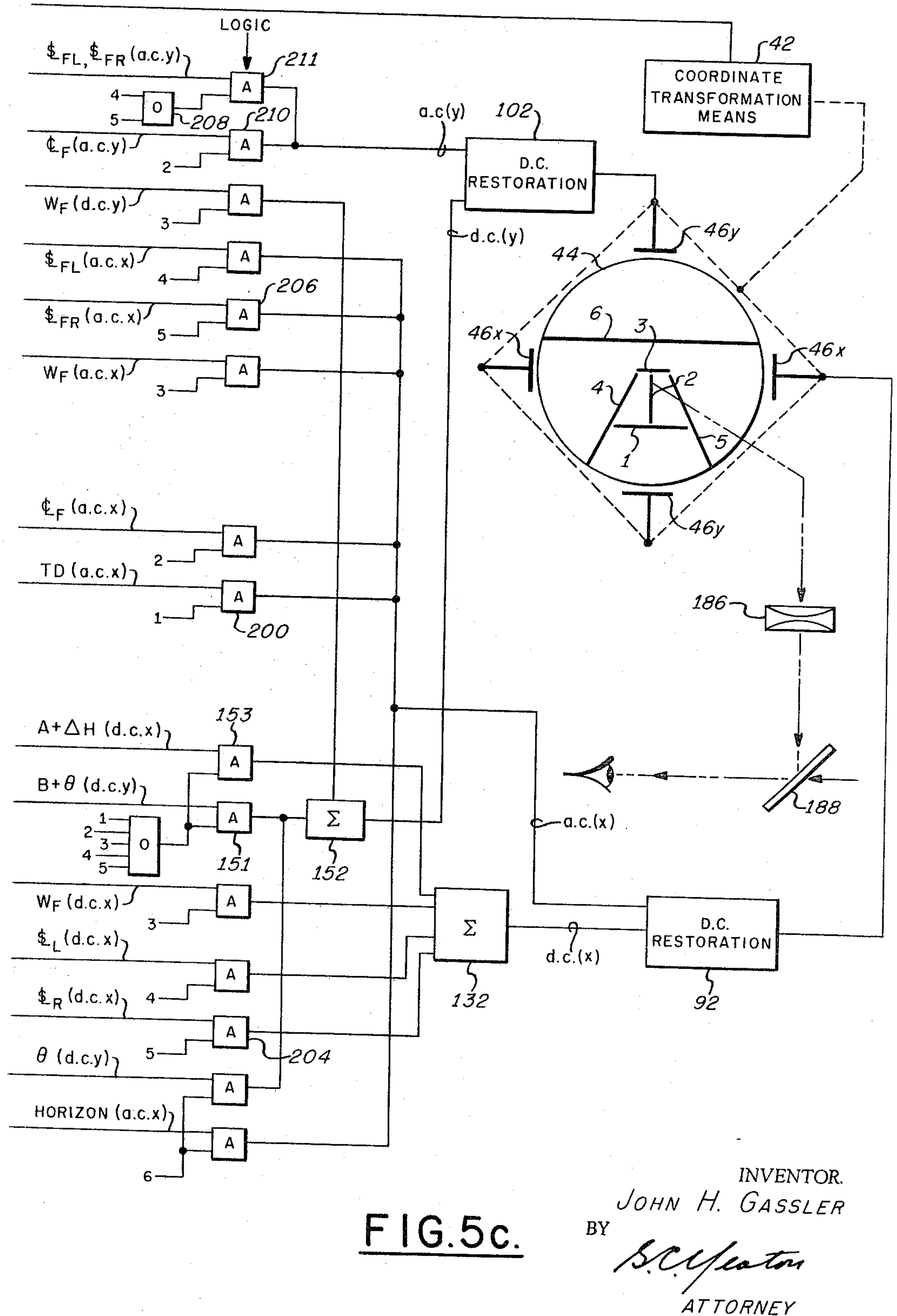

FIGS. 5*a*–5*c* are schematic block diagrams of a system embodying the invention.

In FIGS. 1*a* and 1*b*, values and traces are shown as provided respectively by prior art runway image producing apparatus and apparatus embodying the invention. As taught by copending application S.N. 164,769, now Patent No. 3,237,193, a horizon line 20 gets displaced with respect to a reference location on a cathode ray tube, hereafter sometimes called a C.R.T., in proportion to craft pitch attitude $\theta$, the runway image 22 itself being positioned below the horizon line 20 in proportion to a quantity B equal to the sum of a signal $\gamma_0$ representing the angle that the craft landing glide path makes with respect to the earth and a signal E provided by the craft Instrument Landing System glide slope receiver. Displacement of the runway image parallel to the horizon line 20 is in proportion to the sum of a signal $\Delta$ H representing the craft heading with respect to the runway heading and a signal A derived (as will be shown later) from a signal D provided by the craft Instrument Landing System localizer receiver. Craft roll $\phi$ causes all traces on the C.R.T. to rotate proportionately about the axis of the tube. From FIG. 1*a*, it can be seen that a runway threshold line 24 and a runway center line 26 together form an inverted T as taught by copending application S.N. 164,769. The threshold line 24 together with the bounding lines 28, 30 and 32 form a four-sided runway image somewhat as disclosed by copending application S.N. 240,836, now Patent No. 3,242,493. The manner of computing the angle $\psi$ that the runway center line makes with respect to the threshold line 24 is taught by copending application S.N. 164,769.

FIG. 1*b* shows the image of FIG. 1*a* as improved by apparatus embodying the invention, i.e. the runway side lines ℄$_L$ and ℄$_R$ are extended, the threshold line TD being the same here as in the case of line 24 of FIG. 1A, the far end of the runway being designated $W_F$. Collimating the light from the cathode ray tube images and directing same to the eyes of a pilot so as to provide a runway image overlay constitutes the invention taught by copending application S.N. 164,769.

In providing the instant apparatus, a fundamental supposition has been made, viz. that the TD and $W_F$ image lines always appear parallel to the horizon line 20, such being the case so long as the craft is not appreciably displaced sideways with respect to the real world runway center line (i.e. when there is a large localizer signal D)

which fact is usually the case. By making this supposition, the present apparatus departs from the four-sided image techniques of copending application S.N. 240,836, and in so doing so overlay simplifies the apparatus needed for image generation.

With apparatus embodying the present invention, a locally generated runway image as shown in FIG. 1*b* is provided above some predetermined altitude, and then when the craft is below that altitude a locally generated image of the form shown in FIG. 1*c* is provided.

From FIGS. 2*a* and 2*b*, the runway image lines depicted on FIG. 1*b* are shown subtending various correspondingly designated angles, the ordinates X—X and Y—Y being representative of the C.R.T. beam deflection circuits employed for generation of the image lines. Following is a set of equations directly derivable from FIGS. 2*a* and 2*b*, such equations being useful in determining the lengths of the various lines to be inscribed for generating the runway image of the invention, and being all set forth under the assumption that the $W_F$ and TD lines are parallel, i.e. that the Y ordinate components for the side lines $\$_L$ and $\$_R$ and the center line ℄ are identical. In examining these equations, it should be borne in mind that (X) and (Y), and the subscripts F, L, and R represent (when the image is roll stabilized) respectively "C.R.T. X-axis beam deflection," "Y-axis beam deflection," "Far," "Left," and "Right":

$$R^*=\frac{h}{\sin\gamma_0}\cong R'\cong\frac{h}{\gamma_0} \qquad (1)$$

$$TD(X)=2\tan^{-1}\frac{\frac{1}{2}W}{R'}\cong\frac{W\gamma_0}{h} \qquad (2)$$

$$W_F(X)=2\tan^{-1}\frac{\frac{1}{2}W}{L+R'}\cong\frac{W}{L+\frac{h}{\gamma_0}} \qquad (3)$$

$$℄_F(Y)=\tan^{-1}\frac{L\sin\gamma_0}{L\cos\gamma_0+R^*}\cong\frac{L\gamma_0}{L+\frac{h}{\gamma_0}} \qquad (4)$$

where W represents runway width, R* represents craft range to the aim point, and L represents runway length. On examining Equations 2, 3 and 4 (Equation 1 merely defines range R* in terms of altitude), which equations are for prescribing respective runway lines on the C.R.T., it is seen that Equations 3 and 4 for the runway far end line $W_F$ and the center line $℄_F$ are identical except for their numerators. Now, by making the reasonable assumptions of a standard runway width (200 feet), of a standard runway length (10,000 feet), and a standard glide slope angle (2½ degrees), Equation 3 becomes different from Equation 4 by a mere constant. Therefore, for example, a mere single potentiometer suitably wound or loaded may have its wiper driven in accordance with altitude, i.e. range, signals to produce a pair of signals for generating a pair of runway image lines. Also, since Equation 2 has only variable in it, one potentiometer may for example be employed for generation of a signal for tracing the threshold line TD.

As aforesaid, a signal A representing the angular displacement sideways of a craft from the runway aim point may be derived from the signal D. See FIG. 3 and its related derivation, where δL represents the distance the localizer transmitter is located behind the far end line $W_F$. Realizing that δL is usually a constant of about 1000 ft., a single potentiometer for example may again be used in computation of the signal A, i.e. by exciting a suitably wound or loaded potentiometer with the signal D and varying its wiper location in accordance with altitude (or range) a signal results which when summed with the signal D provides the signal A.

From FIGS. 4*a* and 4*b*, which show respectively the "On Course" and "Off Course" appearances of the runway image during a landing maneuver, the following equations may be set forth:

$$℄_F(X)=℄_F(Y)\cot \qquad (5)$$

$$\$_{FL}(X)=\frac{TD-W_F(X)}{2}+℄_F(X) \qquad (6)$$

$$\$_{FR}(X)=-\frac{TD-W_F(X)}{2}+℄_F(X) \qquad (7)$$

$$\$_{FL}(Y)=\$_{FR}(Y)=℄_F(Y) \qquad (8)$$

Note should be made that so long as the craft is "On Course" the X-ordinate components of the center lines, $℄_F$(X), for the side line equations vanish. That Equation 8 is a true statement of conditions depends from the fact that the invention presupposes that the threshold line TD and runway far end line $W_F$ both always remain parallel to the horizon line 20.

Before describing an arrangement of circuit components for mechanizing the above equations of the instant invention, the general way in which the improved form of runway image is inscribed on the face of a cathode ray tube will be set forth: First, the aim point of the image is located by means of D.C. biasing potentials $B+\theta$ (to the C.R.T. Y-axis deflection circuit) and $A+\Delta H$ (to the C.R.T. X-axis deflection circuit). Then, by applying an A.C. signal to the X-axis deflection circuit of the C.R.T., such A.C. signal having a peak-to-peak amplitude representative of $W\gamma_0/h$ (Equation 2 above), the runway TD line will be suitably inscribed on the C.R.T. face. With $B+\theta$ and $A+\Delta H$ bias voltages still applied respectively to the Y-axis and X-axis deflection circuits of the C.R.T., the A.C. signal $W\gamma_0/h$ is removed and instead an unfiltered rectified A.C. as defined by Equation 4 above is applied to the Y-axis deflection circuit of the C.R.T. For "Off Course" situations above 70 feet of altitude, an unfiltered rectified A.C. signal $℄_F$(X) as defined by Equation 7 here gets simultaneously applied to the C.R.T. X-axis deflection circuit while the signal representative of Equation 4 gets applied to the C.R.T. Y-axis deflection circuit.

As for locating quiescent points for the other runway image lines, this is done principally by detecting the peak amplitudes of already available signals. For example, in inscribing the side line $\$_{FL}$, the signal TD has its peak detected to produce a D.C. potential which gets added to the D.C. bias signal $A+\Delta H$ to locate a new quiescent point. Now, simultaneously full wave A.C. signals $\$_{FL}$(X) and $\$_{FL}$(Y) get applied to the C.R.T.X. and Y deflection circuits, whereby by Lissajous techniques the skewed side line $\$_{FL}$ results. Other lines and quiescent points are provided similarly.

At an altitude of 70 feet, the rectified A.C. signal as defined by Equation 4 to provide the shortened center line is converted to a full wave A.C. signal (by closing a switch to short out a rectifier) and the touchdown threshold line TD as defined by signal defining Equation 2 is removed (by opening of a switch).

Referring to FIG. 5, a vertical gyroscope 40, providing A.C. signals $\phi$ and $\theta$ representing respectively craft roll and pitch attitudes with respect to a reference attitude, applies its signal $\phi$ to a coordinate transformation means 42 which operates to rotate images appearing on the face tof a cathode ray tube 44 about the axis of the tube. Here, for ease of understanding the C.R.T. axis and the craft longitudinal axis are assumed aligned. The coordinate transformer 42 may take a variety of forms and to facilitate understanding the operation of apparatus embodying the invention is shown as a servomotor mechanically linked to rotate electrostatic deflection plates 46X and 46Y of the cathode ray tube 44 about its axis. While electrostatic deflection plates are shown, magnetic deflection techniques may, of course, also be employed.

The A.C. signal $\theta$ from the vertical gyroscope 40 is applied to a summing element 48 together with an A.C. signal B provided by a modulator 50. To provide the signal B for application to the summing element 48, the modulator 50 receives a D.C. output signal B from a summing element 52, which summing element sums a D.C. output signal E from an Instrument Landing System glide slope receiver 54 and a D.C. signal $\gamma_0$* provided by a glide slope angle selector 56. The signal $\gamma_0$* represents the angle that the radio defined glide slope makes with respect to the earth, and the signal E represents the angular displacement of the craft from that defined course. Since during flare-out control along an ILS defined course is no longer had, use of the signal E in positioning the runway image is eliminated below 70 feet via actuation of a switch 304. The glide slope angle selector may be a potentiometer excited by a D.C. voltage, being settable by means of a knob 58. The A.C. output signal from the summing element 48 is converted by a demodulator 59 back to a D.C. signal $B+\theta$ for locating the aim point of the runway image along the Y-axis of the cathode ray tube 44.

An altitude sensor 60, providing an altitude signal $h$, applies such signal to a servo 62 for driving the wipers of three potentiometers 64, 66 and 70 in proportion thereto. The servo 62, it is understood, has suitable damping and is provided with displacement feedback for cancelling the signal $h$. An Instrument Landing System localizer receiver 72, providing a D.C. signal D representing the craft angular displacement with respect to a real world runway center line taken generally at the localizer transmitter location (see FIG. 3), applies such signal to a modulator 74 wherein it is converted to an A.C. signal for excitation of the potentiometer 64. With the potentiometer 64 wound (or suitably loaded) in accordance with the numerator of the first term of the equation derived in conjunction with FIG. 3, the signal appearing on the wiper of the potentiometer 64 will be an A.C. signal $$\frac{(L+\delta L)\gamma_0 D}{h}$$

Application of this last-named signal to a summing element 76, together with the A.C. signal D from the modulator 74, provides a resultant A.C. signal A.

A heading sensor 78, which may be a gyromagnetic compass system, applies its A.C. output signal H to a comparison device 80 connected to receive an A.C. output signal $H_R$ from a runway heading selector 82. The runway heading selector 82 is adapted to be set by means of a knob 84 to provide an A.C. output signal representing the heading of the real world runway onto which it is desired to land. The runway heading selector 82 may take the form of a simple synchro transmitter. The comparison device 80 provides an A.C. signal $\Delta H$ representing the instantaneous heading of the craft with respect to the heading of the runway and applies such signal $\Delta H$ to a summing element 86. The summing element 86 receives also the A.C. signal A and applies its own A.C. output signal $A+\Delta H$ to a demodulator 88 which converts such signal to a D.C. signal for application to the cathode ray tube 44 X-axis deflection circuit, whereby the aim point of the C.R.T. runway image is located along the tube X-axis.

The potentiometer 66 is wound (or suitably loaded) to provide the numerator of Equation 2 above, whereby when an oscillator 90 excites the potentiometer 66 an A.C. signal appears on the wiper of the potentiometer 66 which is of a magnitude proportional to the quantity TD. The A.C. signal TD is applied through a logic circuit (to be described later) to the X-axis deflection circuit of the cathode ray tube 44 via a D.C. restoration element 92, which element serves to vary the D.C. reference for A.C. signals applied to it in accordance with output signals from a D.C. summing element 132.

The potentiometer 70 is wound (or suitably loaded) to accommodate Equation 4 above, and is excited by the oscillator 90. The A.C. signal ℄$_F$(Y) appearing on the wiper of the potentiometer 70 is developed across a resistor 98, and is representative of the Y-axis component of the far end of the runway center line as it appears on the face of the cathode ray tube 44. This signal ℄$_F$(Y) is applied through a diode 100, which diode is adapted to pass only the positive half cycle of its received A.C. signal, being then applied through the logic circuit to the Y-axis deflection circuit of the cathode ray tube via the D.C. restoration element 102. The diode 100 may be shorted when a switch 101 closes, whereby a full wave A.C. may be applied through the logic circuit to the Y-axis deflection circuit. The resistor 98 is tapped to provide the signal $W_F(X)$ for generating a trace representing the far end of the runway, being applied through the logic circuit to the X-axis deflection circuit of the cathode ray tube 44 via the D.C. restoration element 92.

The A.C. signal A from the summing element 76 and the A.C. signal B from the modulator 50 are applied to a resolving circuit 104, which circuit may be like the circuit of FIG. 5 of copending application S.N. 164,769. The resolving circuit 104 produces a signal $\psi$ representing the angle that the real world runway center line appears skewed as a result of lateral displacement of the craft with respect to the localizer defined course. The signal $\psi$ is applied to a cotangent generator 106, e.g. a potentiometer wound to provide a cotangent function, which provides the output signal cot $\psi$. The signal cot $\psi$ is applied to a signal multiplying device 108 which receives also the signal ℄$_F$(Y) from the potentiometer 70. Therefore, the output signal from the multiplying element 108 is the X-axis component of the runway center line as defined by Equation 5 above. By applying the signal ℄$_F$(X) through a phase sensitive demodulator 124, which may for example be a chopping circuit adapted to pass only the positive half cycle of the A.C. signal ℄$_F$(X) provided by the multiplying element 108 when the craft is left ($\psi=90°-e$) of the localizer defined course and the negative half cycle of the signal ℄$_F$(X) when the craft is right ($\psi=90°+e$) of the localizer defined course, the center line ℄$_F$ may be properly skewed above 70 feet of altitude. Below 70 feet of altitude where the center line doubles in size, the demodulator 124 is shorted out by actuation of a switch 302, since both halves of the phase sensitive A.C. signal ℄$_F$(X) are needed.

To compute side line Equation 6 above, the signal TD is applied across a resistor 112 which is so tapped that only one half the signal TD is applied to a difference amplifier 114. The signal $W_F(X)$ appearing on the tap of the resistor 98 is applied across a resistor 116 also tapped so that half of its applied signal is applied to the difference amplifier 114. The A.C. output signal $$\frac{TD-W_F(X)}{2}$$

appears across a grounded center tapped inductor 118 and gets applied to a summing element 122. The summing element 122 also receives the signal ℄$_F$(X) which as aforesaid contains phase information for the proper skewing of the side lines. Therefore, the output signal ℄$_{FL}$(A.C. $x$) appears at the output of the summing element 122 and gets applied through the logic circuit to the D.C. restoration element 92 and thence to the X-axis deflection circuit of the cathode ray tube 44. The Y-axis components of the far left side line is, as above stated (Equation 8), the same as the Y-axis component of the far center line; therefore the signal appearing on the wiper of the potentiometer 70 gets applied through the logic circuit to the D.C. restoration element 102 for application to the Y-axis deflection circuit of the cathode ray tube 44.

For inscribing the far right side line of the runway image on the face of the cathode ray tube 44, the inverse of the signal applied to the summing element 122 is taken off the opposite end of the inductor 118 and applied to a summing element 126, such element also receiving the signal ℄$_F$(X). Hence, the summing element 126 provides an output signal $\$_{FR}$(A.C. $x$) in accordance with Equation 7 above. This signal $\$_{FL}$(A.C. $x$) gets applied through the logic circuit to the D.C. restoration element 92 for application to the X-axis deflection circuit of the cathode ray tube 44. To generate the Y-axis component of the far right side line of the runway image appearing on the C.R.T. face the signal appearing on the wiper of the potentiometer 70 is again applied to the Y-axis deflection circuit of the cathode ray tube 44 via the D.C. restoration element 102. Inscribing each of the far side lines of the runway image on the face of the cathode ray tube 44 is done by simultaneously exciting both the X-axis and Y-axis deflection circuits with in phase components of full wave A.C. signals in the manner of well-known Lissajou techniques. To locate a quiescent point for the left side line, the signal TD is applied to a peak detector 130, which circuit provides a D.C. bias signal $\$_L$(D.C. $x$) which gets applied through the D.C. summing element 132 to the D.C. restoration circuit 92. Similarly the peak detector 130 provides a D.C. signal $\$_R$(D.C. $x$) from the negative half cycle of the A.C. signal TD. Hence, both the X-axis, i.e. the left and right, quiescent points on the face of the cathode ray tube 44 needed for generation of the two far side lines is provided, the quiescent Y-axis points here both being the same as that for the TD line, viz. $\theta+B$.

To locate the C.R.T. Y-axis quiescent point for the line representing the far end of the real world runway as provided by the signal $W_F$(A.C. $x$), the pulsating D.C. signal appearing at the output of the rectifier 100 has its peak detected by a peak detector 150 to provide a D.C. bias signal $W_F$(D.C. $y$), which signal gets applied through the logic circuit to the D.C. summing element 152 for application to the Y-axis D.C. restoration circuit 102.

Location along the X-axis of the cathode ray tube of the quiescent point for the trace representing the far end of the real world runway is provided by detecting the peak, by means of an element 156, of the A.C. signal ℄$_F$(X) and applying it as a D.C. reference signal $W_F$(D.C. $x$) to the D.C. summing element 132 for application to the C.R.T. X-axis D.C. restoration circuit 92.

The signal $\theta$ is applied to a demodulator 178 and applied as a D.C. bias signal through the logic circuit to the Y-axis D.C. restoration circuit 102 via the D.C. summing element 152, whereby a quiescent point for generating a horizon representative trace on the C.R.T. face is provided. The A.C. component for this trace is derived directly from the oscillator 90.

As has been seen so far, various combinations of D.C. and A.C. signal components must be applied to the C.R.T. deflection circuits for inscribing the desired traces of the runway image on the face of cathode ray tube 44, whereby the tube may be time-shared for generation of each of those traces. That is, by suitably first applying D.C. and A.C. signal components to the C.R.T. deflection circuits the threshold line TD may be inscribed; then by applying A.C. and D.C. signal components to the C.R.T. deflection circuits for inscribing the far center line, that line may be provided; etc. The face of the cathode ray tube 44 is shown in FIG. 5 with an image comprising six distinct numbered lines (disjoined intentionally for purposes of clarity), which numbers indicate the order in which the cathode ray tube deflection circuits are time-shared for respective line generation. To provide a six-step time-sharing operation, a three-stage register 180 receives a clock pulse and applies its binary output to a binary-to-decimal decoder 182 having six output leads which are successively excited. When the register 180 stores the binary equivalent of decimal six, i.e. a $2^2$ and $2^1$, an AND gate circuit 184 applies a CLEAR pulse to the register 180, whereby the decoder output leads 1–6 are again successively excited as a result of the clock pulses. The logic circuit comprises suitably arranged OR and AND gate circuits having respective input leads designated by the numerals 1–6 to indicate the decoder 182 output leads to which they are respectively connected.

The light from the scene which appears on the face of the cathode ray tube 44 is shown being collimated by a lens 186 and directed to the eyes of a pilot via a semitransparent combining glass 188 in accordance with the teaching of copending application S.N. 164,769.

To show the operation of the apparatus of FIG. 5, a couple of the C.R.T. traces will be specifically developed step-by-step, viz. trace 1 representing the runway threshold TD and trace 5 representing the far right runway side line $\$_{FR}$.

Trace 1: With the decoder 182 lead 1 excited, the D.C. summing element 152 receives (through a logic circuit element 151) only the D.C. signal $B+\theta$ and applies it to the D.C. restoration element 102 (which receives at this time no A.C. signal) for application to the Y-axis deflection circuit of the C.R.T.; simultaneous with application of the D.C. signal $B+\theta$ to the Y-axis deflection circuit, an AND gate 200 opens in response to the decoder output signal on its lead 1, whereupon the A.C. signal TD gets applied to the X-axis D.C. restoration circuit 92 for application to the C.R.T. X-axis deflection circuit. Applied simultaneously with the A.C. signal TD to the D.C. restoration circuit 92 is a D.C. signal $A+\Delta H$ which gets applied, like the D.C. signal $B+\theta$, through a logic circuit element in response to excitation of the decoder 182 output lead 1 to the D.C. summing element 132. Therefore, the X-axis D.C. signal component serves to shift left and right on the C.R.T. face the reference point used for generation of the threshold line TD. Below 70 feet of altitude, the signal TD is removed from the D.C. restoration circuit 92 by actuation of a switch 306.

Trace 5: A signal on lead 5 causes AND gate 204 to apply the D.C. signal $\$_R$ (D.C. $x$) to the summing element 132. Therefore the X-axis D.C. reference point is determined by the D.C. signals $\$_R$ (D.C. $x$) and $a+\Delta H$, which latter signal is applied to the summing element 132 when the decoder 182 lead 5 is excited to open an AND gate 153. Simultaneous with application of the signal $\$_R$ (D.C. $x$)$+A+\Delta H$ via summing element 132 to the D.C. restoration element 92, a full wave A.C. signal $\$_{FR}$ (A.C. $x$) gets applied thereto through an AND circuit 206. Further at this time, an OR circuit 208 applies a signal to open an AND circuit 211 whereby the full wave A.C. signal $\$_{FR}$ (A.C. $y$) gets applied to the Y-axis D.C. restoration element 102, which element 102 receives the signal $B+\theta$ via the D.C. summing element 152. Hence, by means of the above-mentioned Lissajous principle the far right runway side line trace is provided.

As to changing (at and below an altitude of 70 feet) the runway image from that shown in FIG. 1*b* to that shown in FIG. 1*c*, a coincidence altitude sensor 300, e.g. the circuit (elements 10, 28, 30 and 32) shown and described in U.S. Patent 3,089,671, actuates four switches at the 70 feet altitude, viz. switches 101, 302, 304, and 306.

Obviously many modifications within the scope of the above-described invention are possible, e.g. the order of generating the runway image lines may be varied, or, if preferred, instead of rectifying trace producing signals, such signals may be left as unaffected sine wave signals with respective appropriate half cycles being blanked by a blanking circuit associated with the cathode ray tube 44.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Aircraft instrument apparatus for use in landing an aircraft comprising a cathode ray tube, means for producing a first trace on the face of said cathode ray tube, means for producing a second trace on said cathode ray tube, said first trace being representative of the threshold of a real world runway and said second trace being representative of the center line of said real world runway, means for so aligning said first and second traces on the face of said cathode ray tube that said second trace runs toward said first trace, and means for eliminating said first trace from the face of said cathode ray tube and extending the length of said second trace when said craft is at and below a predetermined altitude.

2. Aircraft instrument apparatus comprising a cathode ray tube, means for producing a first trace on the face of said tube, means for producing a second trace on the face of said tube that runs toward said first trace, said second trace being representative of the center line of a real world runway and said first trace being representative of the threshold of said runway, means for producing a first signal proportional to the angular displacement of said craft with respect to a plane that is perpendicular to the surface of the earth and is coincident with the center line of said real world runway, means for producing a second signal proportional to the angular displacement of said craft from the surface of the earth taken with respect to the threshold of said real world runway, means adapted to receive said first and second signals for positioning both said traces substantially sideways across the face of said tube in proportion to said first signal and in a direction perpendicular to said sideways direction in proportion to said second signal, and means for eliminating said first trace from the face of the cathode ray tube and extending the length of said second trace when said craft is at and below a predetermined altitude.

3. Aircraft instrument apparatus comprising a cathode ray tube, means for producing a first trace on the face of said tube, means for producing a second trace on the face of said tube that runs toward said first trace, said second trace being representative of the center line of a real world runway and said first trace being representative of the threshold of said runway, means for producing a first signal proportional to the angular displacement of said craft with respect to a plane that is perpendicular to the surface of the earth and is coincident with the center line of said real world runway, means for producing a second signal proportional to the angular displacement of said craft from the surface of the earth taken with respect to the threshold of said real world runway, means adapted to receive said first and second signals for positioning both said traces substantially sideways across the face of said tube in proportion to said first signal and in a direction perpendicular to said sideways direction in proportion to said second signal, means for eliminating said first trace from the face of the cathode ray tube and extending the length of said second trace when said craft is at and below a predetermined altitude, means for collimating the light from the images on the face of said cathode ray tube, and means for directing said collimated light images to the eyes of a pilot.

4. Runway image producing apparatus for aircraft comprising a cathode ray tube having first and second deflection circuits for use in orthogonally deflecting the beam of said cathode ray tube, first means for use in producing a signal having an alternating component having a peak-to-peak amplitude directly proportional to the product $W\gamma_0$, where W is a constant representative of a standard runway width and $\gamma_0$ is a constant representative of a standard landing glide angle, means for inversely varying said amplitude as a function of craft range to a real world runway, means for use in producing a signal having an alternating component with a peak-to-peak amplitude proportional to $$\frac{L\gamma_0}{L+R}$$

where L is a constant representative of a standard runway length measured from a runway aim point to its far end and where R represents craft range to said real world runway, means for use in applying the alternating and inversely varied signal component $W\gamma_0$ to said first cathode ray tube deflection circuit only when the craft is above a predetermined altitude, said last-named means being also for use in applying the alternating signal component $$\frac{L\gamma_0}{L+R}$$

to said second deflection circuit of said cathode ray tube, and means for expanding the trace that said signal component $$\frac{L\gamma_0}{L+R}$$

makes on the face of the cathode ray tube when the craft is below said predetermined altitude.

5. The apparatus of claim 4 including means for use in applying, above said predetermined altitude, to said second cathode ray tube beam deflection circuit a D.C. bias signal proportional to the sum of craft pitch attitude relative to a reference attitude plus the angle that a radio-defined course makes with the ground plus craft deviation from that radio-defined course, and below said altitude applying thereto a signal proportional to the sum of the craft pitch attitude relative to said reference attitude plus said angle that said radio defined course makes with the ground, and means for use in applying to the first of said beam deflection circuits a signal proportional to the sum of the craft angular displacement with respect to a line running parallel to the length of the runway plus craft heading with respect to the heading of the length of the runway.

6. The apparatus of claim 5 including means for collimating the light from the images on the face of said cathode ray tube, and means for directing said collimated light images to the eyes of a pilot.

7. The apparatus of claim 4 including apparatus for use in providing a pair of traces on the face of the cathode ray tube which are respectively representative of the side lines of the real world runway, said apparatus including means for use in producing a first signal having an alternating component with a peak-to-peak amplitude proportional to $TD-W_F$, where TD is proportional to $$\frac{W\gamma_0}{h}$$

and $W_F$ is proportional to $$\frac{W}{L+\frac{h}{\gamma_0}}$$

and where L, W, $\gamma_0$ and $h$ represent respectively a standard runway length, a standard runway width, a standard glide slope angle, and craft height above said real world runway, means for use in producing a second signal having an alternating component with a peak-to-peak amplitude proportional to $$\frac{2L\gamma_0}{L+\frac{h}{\gamma_0}}$$

and means for use in simultaneously applying said first and second signals in phase respectively to the first and second means for orthogonally deflecting the beam of said cathode ray tube.

8. Aircraft instrument apparatus for use in landing an aircraft comprising a cathode ray tube, means for producing a first trace on the face of said cathode ray tube, means for producing a second trace on said cathode ray tube, said first trace being representative of the threshold of a real world runway and said second trace being representative of the center line of said real world runway, means for so aligning said first and second traces on the face of said cathode ray tube that said second trace runs toward said first trace, means for eliminating said first trace from the face of said cathode ray tube and extending the length of said second trace when said craft is at and below a predetermined altitude, and means for producing third and fourth traces on the face of said cathode ray tube, which traces are substantially longer than the second trace only when said craft is above said predetermined altitude and run generally in the direction of said second trace on respective sides of said second trace.

9. The apparatus of claim 8 including means for collimating the light from the images on the face of said cathode ray tube, and means for directing said collimated light images to the eyes of a pilot.

10. Apparatus for use by an aircraft for displaying to a pilot an image representing a real world runway comprising a cathode ray tube, means for use in providing a configuration on the face of said cathode ray tube appearing as a T inverted so that its length is upside down and bounded by an inverted trough the sides of which are longer than the length of said T, and means for modifying when the craft is below a predetermined altitude the configuration on the face of said cathode ray tube to appear as an inverted trough bounding a straight-line approximately the same length as a side of said control.

11. The apparatus of claim 10 including means for providing a signal representative of craft displacement from a radio defined glide course and means for moving the configuration along a particular axis of the cathode ray tube in accordance with said signal only when said craft is above said predetermined altitude.

No references cited.

CHESTER L. JUSTUS, *Primary Examiner*.

B. L. RIBANDO, *Assistant Examiner*.